(12) United States Patent
Schaad et al.

(10) Patent No.: US 11,053,900 B2
(45) Date of Patent: Jul. 6, 2021

(54) VALVE FOR METERING A FLUID

(71) Applicant: Robert Bosch GmbH, Stuttgart (DE)

(72) Inventors: Andreas Schaad, Maulbronn (DE); Joerg Abel, Gerlingen (DE); Juergen Maier, Ottmarsheim (DE); Martin Buehner, Backnang (DE); Matthias Boee, Ludwigsburg (DE); Olaf Schoenrock, Stuttgart-Weilimdorf (DE); Philipp Rogler, Stuttgart (DE); Stefan Cerny, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/752,522

(22) PCT Filed: Jul. 11, 2016

(86) PCT No.: PCT/EP2016/066384
§ 371 (c)(1),
(2) Date: Feb. 13, 2018

(87) PCT Pub. No.: WO2017/029031
PCT Pub. Date: Feb. 23, 2017

(65) Prior Publication Data
US 2019/0010906 A1 Jan. 10, 2019

(30) Foreign Application Priority Data
Aug. 14, 2015 (DE) .......................... 102015215537.4

(51) Int. Cl.
*F02M 51/06* (2006.01)
*F02M 63/00* (2006.01)
(Continued)

(52) U.S. Cl.
CPC ...... *F02M 51/0685* (2013.01); *F02M 51/066* (2013.01); *F02M 55/008* (2013.01);
(Continued)

(58) Field of Classification Search
CPC ............. F02M 51/0685; F02M 51/066; F02M 55/008; F02M 63/0022; F02M 2200/304; F16K 31/0665; F16K 31/0693
(Continued)

(56) References Cited

U.S. PATENT DOCUMENTS 6,367,769 B1   4/2002   Reiter
6,450,424 B1   9/2002   Horbelt
(Continued)

FOREIGN PATENT DOCUMENTS

CN     1704580 A     12/2005
DE     10360330 A1    7/2005
(Continued)

OTHER PUBLICATIONS

International Search Report dated Oct. 7, 2016 of the corresponding International Application PCT/EP2016/066384, filed Jul. 11, 2016.

*Primary Examiner* — Christopher S Kim
(74) *Attorney, Agent, or Firm* — Norton Rose Fulbright US LLP; Gerard Messina

(57) ABSTRACT

A valve for metering a fluid, for example, a fuel injection valve for an internal combustion engine, includes a valve-seat face, an electromagnetic actuator including an armature that includes a through-flow channel that opens with an outlet opening at an end face of the armature, a valve needle on which the armature is movably supported and that is operable using the armature, a valve-closing member that is actuatable by the valve needle and that cooperates with the valve-seat face to form a sealing seat, and a stop element that is mounted fixedly on the valve needle and that interacts with the at least one outlet opening of the at least one through-flow channel such that throttling takes place with respect to the least one through-flow channel when the armature is located with its end face at the stop element.

13 Claims, 2 Drawing Sheets

(51) Int. Cl.
*F02M 55/00* (2006.01)
*F16K 31/06* (2006.01)

(52) U.S. Cl.
CPC ..... *F02M 63/0022* (2013.01); *F16K 31/0665* (2013.01); *F16K 31/0693* (2013.01); *F02M 2200/304* (2013.01)

(58) Field of Classification Search
USPC ...................................................... 239/585.3
See application file for complete search history.

(56) References Cited

U.S. PATENT DOCUMENTS 6,520,434 B1 * 2/2003 Reiter ................ F02M 51/0685
239/533.11
6,799,734 B1 10/2004 Hans

FOREIGN PATENT DOCUMENTS

| | | |
|---|---|---|
| DE | 102008055015 A1 | 6/2009 |
| EP | 1300583 A2 | 4/2003 |
| EP | 1602821 A1 | 12/2005 |
| EP | 2706221 A1 | 3/2014 |
| EP | 2851551 A1 | 3/2015 |
| JP | H0240970 U | 3/1990 |
| WO | 2014/048609 A1 | 4/2014 |

\* cited by examiner

VALVE FOR METERING A FLUID

CROSS-REFERENCE TO RELATED APPLICATIONS

The present application is the national stage of International Pat. App. No. PCT/EP2016/066384 filed Jul. 11, 2016, and claims priority under 35 U.S.C. § 119 to DE 10 2015 215 537.4, filed in the Federal Republic of Germany on Aug. 14, 2015, the content of each of which are incorporated herein by reference in their entireties.

FIELD OF THE INVENTION

The present invention relates to a valve for metering a fluid, particularly a fuel injection valve for internal combustion engines. The invention especially relates to the field of injectors for fuel injection systems of motor vehicles, in which preferably fuel is injected directly into combustion chambers of an internal combustion engine.

BACKGROUND

DE 103 60 330 A1 describes a fuel injector for a fuel injection system of internal combustion engines. The known fuel injector includes a valve needle that cooperates with a valve seat face to form a sealing seat, where an armature connected to the valve needle is acted upon by a return spring in a closing direction, interacts with a solenoid coil, and is disposed in a recess of an external pole of the magnetic circuit, and where a collar that is formed circumferentially on the armature. A triangular cross-section, which is formed on the collar, permits direction-dependent hydraulic damping of the armature. In this case, the opening movement is damped, while the closing movement is able to take place unhindered. Fuel channels run in a valve-needle guide, in the armature and on a guide element. The fuel is supplied via a central fuel feed.

SUMMARY

The valve according to the present invention has an improved design and mode of operation. Particularly in the case of an embodiment with a free armature path, it is possible to improve the capability to perform multiple injections, accompanied by brief pause times.

In the case of the valve for metering the fluid, the armature used as solenoid armature is not joined firmly to the valve needle, but rather is overhung-mounted between limit stops. This results in a certain adjusted free armature path. Such stops can be realized, for example, by stop sleeves and/or stop rings or modified forms thereof. In principle, two stop elements can also be provided which limit the movement of the armature on both sides and which are modified in the same or different manner in such a way that each one permits a throttling action with respect to the at least one through-flow channel of the armature when the armature is located with its end face or its further end face at the relevant stop element.

In an initial position, the armature is shifted preferably via at least one spring, to be in the state of rest, to a limit stop that is fixed relative to the valve needle, so that the armature abuts there. Upon actuation of the valve, the complete free armature path is then available as acceleration distance.

In comparison to a firm connection of the armature to the valve needle, an advantage is obtained that, owing to the resulting pulse of the armature during opening, the valve needle can also be opened safely at higher pressures with the same magnetic force. This can be described as dynamic mechanical amplification. A further advantage is that the participating masses are decoupled, so that the resulting impact forces on the sealing seat are split over two pulses. In particular, by decoupling the masses, a tendency of highly dynamic fuel injectors to bounce can thus be reduced.

However, specific problems emerge which are associated with the overhung mounting of the armature on the valve needle. Upon closing of the valve, a problem arises that after impinging on the relevant limit stop, due to the design, the armature can bounce back again, so that in the extreme case, the complete free armature path can be traversed once again, and during the next following impact at the opposite stop, the armature can still have so much energy that the valve needle is once again lifted briefly from its seat. Consequently, an unwanted secondary injection can occur, resulting in increased fuel consumption and elevated emission of pollutants. Even if, when bouncing back, the armature does not pass through the complete free armature path, it can still require some time until it quiets down again and arrives in the initial position. If, prior to finally calming down, a reactivation now takes place, which is important especially in the case of multiple injections with brief pause times between the injections, then the valve no longer functions robustly. For example, it can be that the stop pulses increase or decrease in size accordingly. In a more unfavorable case, the result can be that the valve no longer opens at all, since the stop pulse is no longer sufficient for this.

Depending upon the design and application case, the armature can be damped by disposing the armature in a liquid fluid. In this case, damping can be adjusted via an annular gap that is located between an outer side of the armature and an inner wall of a housing of the valve. However, in the case of such damping, the problem arises that even if it is carried out as a function of direction, it leads to damping over the entire armature travel. The possibilities of such a damping are therefore limited. The restriction of the flow through the at least one through-flow channel of the armature advantageously influences the damping action, since it is intensified specifically in the area of the impact against the pertinent stop element.

One or more advantages can be realized in advantageous manner depending on the form of the valve. The armature can advantageously be prevented from bouncing, so that, notably, an unwanted secondary injection can be prevented and improved calming of the armature can be attained. Furthermore, a more robust capability to perform multiple injections accompanied by short pause times can be realized. In addition, smaller stop pulses can be achieved upon closing, resulting in reduced wear on the armature, the stop sleeve, and the valve seat. First of all, this reduces functional changes conceivable over the service life, and secondly, decreases unwanted noises. Moreover, hydraulic sticking can advantageously be prevented.

During such hydraulic sticking, starting out from its rest position, for example, the armature can adhere hydraulically to the relevant stop, which causes a delayed release in response to an activation. Due to such hydraulic sticking, variations can also result in the control behavior, which can lead to deviations with respect to the amount of fuel injected. In addition, an improvement in the tolerance sensitivity of the damping solution can be achieved.

The valve-closing member, which is actuated by the valve needle, can be formed in one piece with the valve needle. The valve-closing member can be formed as a ball-shaped valve-closing member, or in another manner. The stop element can be implemented as a separate element and joined in suitable manner to the valve needle. For example, the stop element can be welded onto the valve needle. However, a one-piece design made up of the stop element and the valve needle is also conceivable.

An advantageous flow behavior for the damping can also be attained by a plurality of uniformly distributed through-flow channels in the form of through-bores. In addition, a plurality of through-flow channels prevents the throttling from being influenced substantially by a rotational-angle position between the stop and the armature.

In an example embodiment, an advantageous throttling of the flow is obtained, which in addition, is easy to realize geometrically, and because of its geometric form, a certain flexibility of the stop element or a springy property is also attained.

According to an example embodiment, especially if the throttling permitted by the stop element is comparatively small, through-openings, particularly round or cylindrical through-openings, allow removal of material on the stop element concentrated in the area of the outlet openings of the armature. In an example embodiment, the through-openings are formed cylindrically or with a circular opening cross-section.

According to an example embodiment, slots or through-openings are provided in combination with a likewise uniform distribution of the through-flow channels or their outlets at the end face of the armature, making it possible to influence the damping essentially independently of the relative rotational-angle position.

An example embodiment provides an advantage that, in particular, a thickness of a stop collar of the stop element can be adjusted or optimized in order to attain a desired damping effect.

An example embodiment provides an advantage that a hydraulic sticking effect is prevented or at least reduced by an outwardly increasing, slight wedge shape that can lie in the µm-range.

According to an example embodiment, the rebound effect occurring upon closing can be damped efficiently without the armature having to be damped strongly over the entire return path.

Thus, specifically, the damping at the limit stop close to the valve-closing member can be improved. In this manner, a rebound height is reduced, so that armature bounce pulses are avoided and unwanted secondary injections are prevented. In addition, faster quieting of the armature and consequently improved multiple-injection performance can be attained. It is especially advantageous that a direction-dependent damping or a direction-dependent intensified damping of the armature can be attained. In so doing, stop pulses can also be damped, resulting in less wear and tear. Furthermore, hydraulic sticking can therefore be prevented. A further improvement in the tolerance sensitivity of the damping is also obtained.

Preferred exemplary embodiments of the present invention are explained in greater detail in the following description with reference to the attached drawings, in which corresponding elements are provided with identical reference numerals.

DETAILED DESCRIPTION

Figure 1:
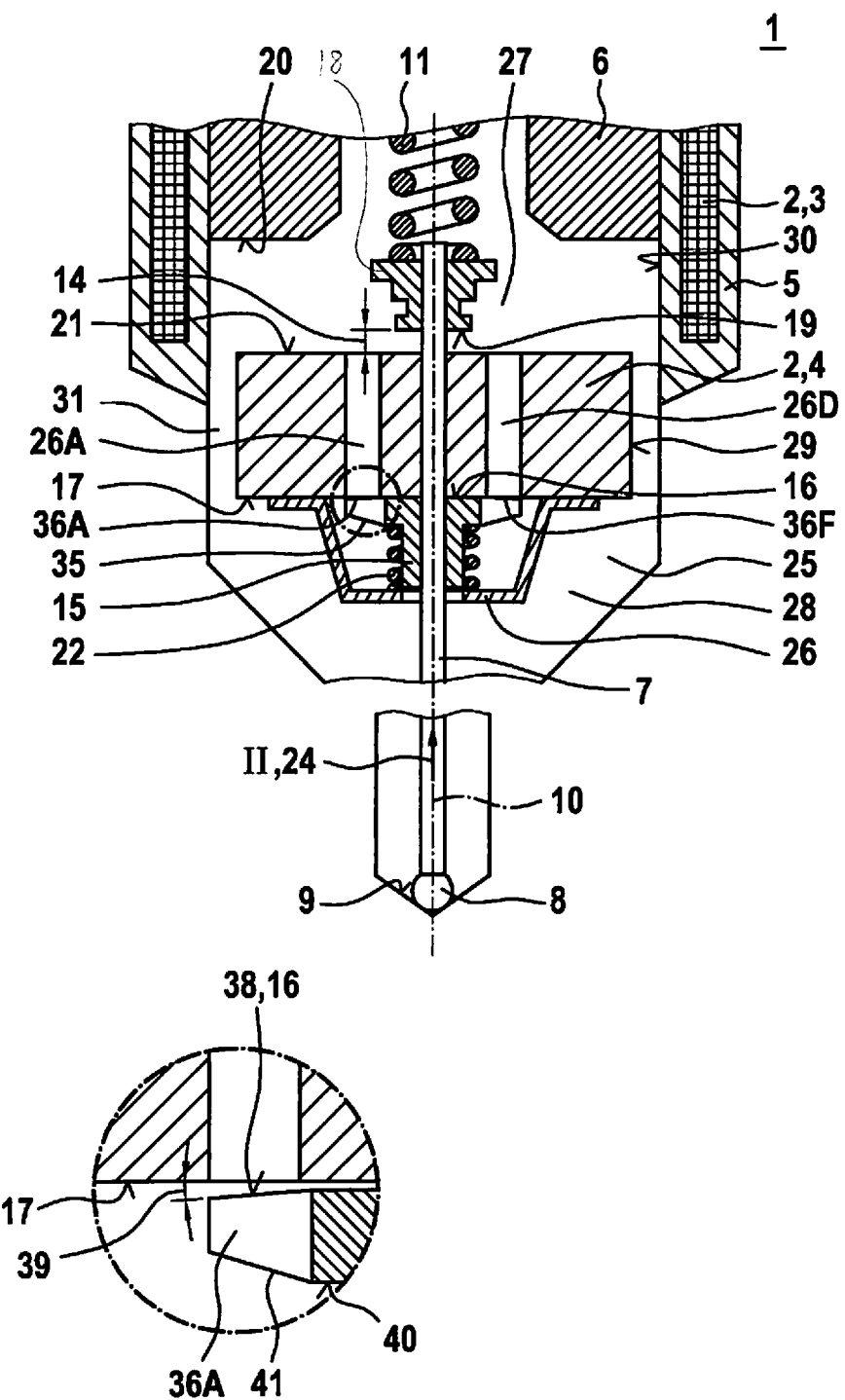
FIG. 1 illustrates a valve in a partial, schematic, sectional representation according to an example embodiment of the present invention.

FIG. 1 shows a valve 1 for metering a fluid in a partial, schematic, sectional representation according to an example embodiment of the present invention. In particular, valve 1 can take the form of a fuel injection valve 1. A preferred application case is a fuel injection system, in which a plurality of such fuel injection valves 1 are formed as high-pressure injection valves 1 and are used for the direct injection of fuel into assigned combustion chambers of the internal combustion engine. In this context, liquid or gaseous fuels can be used as fuel.

Valve 1 has an actuator 2, that includes a solenoid coil 3 and an armature 4. By energizing solenoid coil 3, a magnetic circuit is closed across an at least partial ferromagnetic housing 5 and an internal pole 6, so that armature 4 is actuated. In so doing, a valve needle 7 is in turn actuated via armature 4. Valve needle 7 is used to actuate a valve-closing member 8, that cooperates with a valve-seat face 9 to form a sealing seat. Valve needle 7 is shifted along its longitudinal axis 10.

In the starting position shown in FIG. 1, valve needle 7 is retained in its starting position via a return spring 11, and impinges with valve-closing member 8 against valve-seat face 9. Valve-closing member 8 can be spherical or partially spherical. Valve-closing member 8 can also be formed in a different manner.

A stop element 15 is mounted fixedly on valve needle 7. Formed on stop element 15 is a stop face 16, which faces an end face 17 of armature 4.

In addition, a further stop element 18 is provided, which likewise is fixed with respect to valve needle 7 and on which a further stop face 19 is formed. Moreover, a stop face 20 is also formed on internal pole 6. Stop face 20 of internal pole 6 and further stop face 19 of further stop element 18 are facing a further end face 21 of armature 4 that faces away from end face 17.

In the starting position, armature 4 rests on stop face 16 of stop element 15. In this case, armature 4 is retained on stop element 15 via an armature free-travel spring 22. In response to the energizing of solenoid coil 3, armature 4 is accelerated in an opening direction 24. After passing through a free armature path 14, accelerated armature 4 strikes against further stop face 19 of further stop element 18 and thereby lifts valve needle 7 from its seat. Armature 4 and valve needle 7 subsequently move further together in opening direction 24, until armature 4 strikes against stop face 20 of internal pole 6. In so doing, a certain back swing of valve needle 7 can possibly occur, which is caused by the carrier of valve needle 7.

To close valve 1, solenoid coil 3 is de-energized, so that armature 4 is shifted by return spring 11 counter to opening direction 24. Valve needle 7 then strikes with its valve-closing member 8 against valve seat face 9. Armature 4 subsequently strikes against stop face 16 now stationary relative to housing 5. In principle, the problem of a rebound exists here, in which armature 4 traverses free armature path 14 again in opening direction 24, and in the worst case, strikes against further stop element 18, and opens valve 1 once again.

To prevent such a rebound, armature 4 is damped. In so doing, advantageous damping of armature 4 is realized, which first of all, allows rapid opening and closing, but secondly, also prevents a rebound, which in this exemplary embodiment, is described on the basis of stop element 15.

According to one preferred implementation, entire valve 1 is filled with a fuel. Since selective filling of spaces is not provided here, space 25 is therefore also filled with the fuel. In a further preferred implementation, this holds true correspondingly for other fluids, as well.

A space 25 within housing 5, in which armature 4 is disposed, is generally filled with a liquid fluid. According to the preferred implementations, this liquid fluid, which is possibly a liquid fuel, is the fluid which is guided to the sealing seat.

However, it should be noted that in the case of an embodiment which is possible in principle, but which is further modified, and which is conceivable especially when a gaseous fluid is metered, a different suitable liquid fluid can also be provided in space 25 in order to attain the hydraulic damping.

Armature 4 has a plurality of through-flow channels 26A to 26F, which are formed with suitable through-flow cross-sections. The through-flow cross-sections can be round or kidney-shaped, or can be formed with a different geometry. In this exemplary embodiment, through-flow channels 26A to 26F are formed as through-bores 26A to 26F with round through-flow cross-sections. Through-bores 26A to 26F are implemented in suitable number and placement in armature 4, and connect a subspace 27 of space 25 remote from the valve-seat face to a subspace 28 close to the valve-seat face. In addition, between an outer side 29 of armature 4 and an inner wall 30 of housing 5, an annular gap 31 is formed, which likewise forms a connection between subspaces 27, 28.

In response to a movement of armature 4 in space 25, liquid fluid is displaced, so that it flows through annular gap 31 and through-bores 26A to 26F. Armature 4 is thereby damped. However, this damping also counteracts an acceleration of armature 4, which means the response behavior of valve 1 is damped, as well. This also holds true if a direction-dependent damping is realized, e.g., by a modification at outer side 29 of armature 4, since it is then effective for the corresponding direction over entire free armature path 14. Although such and similar measures can be used for damping armature 4 in one embodiment of valve 1, for these reasons and in order to avoid disadvantages in this respect, a further form of the damping is realized.

Figure 2:
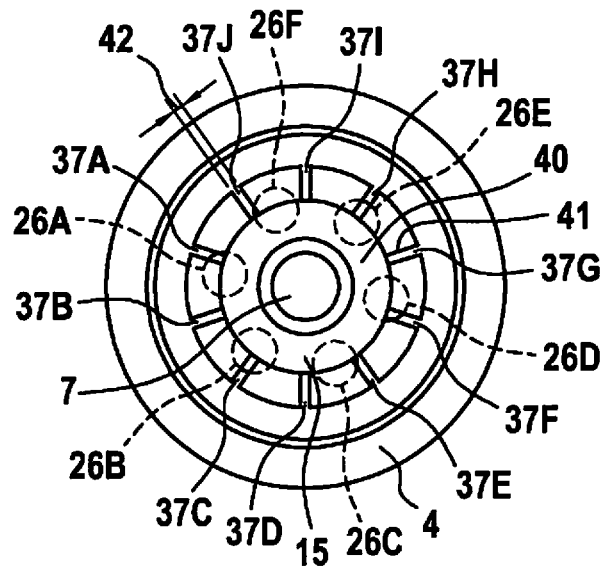
FIG. 2 illustrates an armature and a stop element of the valve shown in FIG. 1 according to a first example embodiment of the present invention from the axial viewing direction denoted by II in FIG. 1.

On stop element 15, a stop collar 35 is formed that extends radially in or over an area where outlet openings 36A to 36F of through-bores 26A to 26F are provided on armature 4, which preferably are round or kidney-shaped. In this case, stop collar 35 takes the form of slotted stop collar 35. In this exemplary embodiment, slots 37A to 37J are provided, as also shown in FIG. 2.

When armature 4 is located with its end face 17 directly on or in the vicinity of stop element 15, then slotted stop collar 35 brings about a throttling action with respect to through-bores 26A to 26F. Thus, among other things, stronger damping is attained shortly before armature 4 strikes against stop element 15. On the other hand, when armature 4 is accelerated in opening direction 24 in order to open valve 1, then this damping action is not effective over a large part of free armature path 14, resulting in good response behavior.

In addition, the stop face facing end face 17 of armature 4 is tapered at least in a section 38, which is illustrated in the detail drawing of FIG. 1 by an angle 39 (not true to scale). The slight wedge shape increasing outwardly can be in the μm-range. Among other things, this wedge-shape prevents greater hydraulic sticking of armature 4 to stop element 15 during operation.

Stop element 15 also has an outer side 40 that faces away from end face 17 of armature 4 and is tapered at least in a section 41. Slots 37A to 37J are located in the area of tapered section 41. Flexibility of stop element 15 is also improved by the reduced material thickness and/or the slotting. Thus, potentially, a certain mechanical damping can also be attained, which is usually secondary, however.

FIG. 2 shows armature 4 and stop element 15 of valve 1 illustrated in FIG. 1 according to a first example embodiment from the viewing direction indicated by II in FIG. 1. Here, it is possible to adjust the hydraulic and mechanical damping action by a slot width 42 between individual slots 37A to 37J. Owing to a mechanical flexibility, a mechanical contact duration upon impact can possibly also be prolonged. In this manner, a stop pulse or momentum transfer is protracted timewise and weakened. At the same time, tolerance sensitivity can also be improved. Thus, dynamic adaptation of the surfaces is possible, for an optimal hydraulic and, as a rule, however, secondary mechanical damping.

The form and placement of slots 37A to 37J in relation to through-bores 26A to 26F of armature 4 can be predetermined in such a way that a constant damping behavior results regardless of the specific rotational-angle position between stop element 15 and armature 4.

Figure 3:
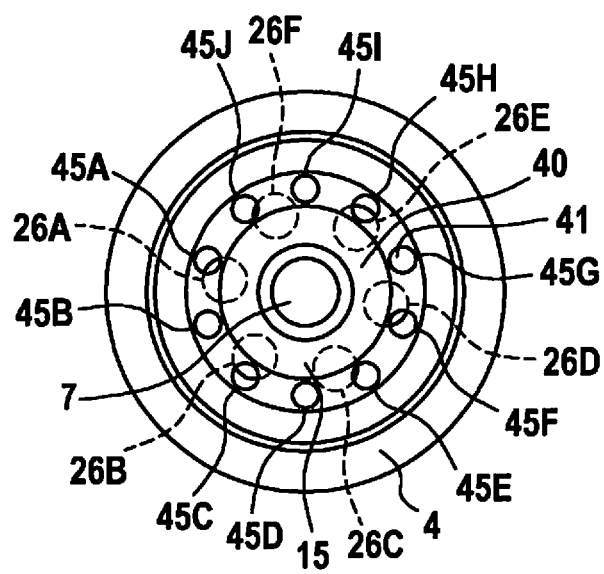
FIG. 3 illustrates an armature and a stop element of the valve shown in FIG. 1 according to a second example embodiment of the present invention from the axial viewing direction denoted by II in FIG. 1.

FIG. 3 shows an armature 4 and a stop element 15 of valve 1, illustrated in FIG. 1, according to a second example embodiment. In this example embodiment, instead of slots 37A to 37J, through-openings 45A to 45J in the form of bores 45A to 45J are provided. In this case, bores 45A to 45J are disposed in tapered section 41 of outer side 40. A passage for the liquid fluid through stop element 15 is able to be created via bores 45A to 45J specifically in the area of outlet openings 36A to 36F. Consequently, remaining stop face 16 may be optimally large.

Thus, by suitable slots 37A to 37J and/or through-bores 45A to 45J in stop element 15, and the simultaneous partial covering of outlet openings 36A to 36F of through-bores 26A to 26F of armature 4, a stroke-dependent damping effect is attained on armature 4. When armature 4 approaches slotted stop element 15 during closing, through-bores 26A to 26F of armature 4 become closed except for the free cross-section ensured through stop element 15, especially the cross-section of slots 37A to 37J or of bores 45A to 45J in the area of outlet openings 36A to 36F, the flow of the liquid fluid through through-bores 26A to 26F of armature 4 is throttled, and the armature movement is thereby damped. The desired damping action can be set or optimized by the configuration of slots 37A to 37J and/or of bores (other through-openings) 45A to 45J of stop element 15, as well as by the wedge shape and also the thickness of stop collar 35.

Therefore, stop element 15 can be suitably designed to damp armature 4 in improved manner during closing, and thereby to prevent or at least to decrease a rebound. A corresponding design is also possible on further stop element 18. Thus, it is possible to improve the hydraulic damping and to enlarge stop face 20. A temperature-dependent sticking associated in principle with that, as well as greater sensitivity with respect to tolerances and tilting can be avoided, inter alia, by the wedge shape or the conical form in section 38 of stop face 16 and section 41 of outer side 40 of stop element 15.

In the example embodiment described, slots 37A to 37J extend in the radial direction. In addition, in an example embodiment, bores 45A to 45J all have the same radial distance to longitudinal axis 10 of valve needle 7. However, other designs can also be realized, depending on the application case.

The present invention is not limited to the exemplary embodiments described.

What is claimed is:

1. A valve for metering a fluid, the valve comprising:
   a valve-seat face;
   an electromagnetic actuator including an armature, wherein the armature includes a plurality of through-flow channels, wherein each of through-flow channels opens with a corresponding one of a plurality of outlet openings at an end face of the armature;
   a valve needle on which the armature is movably supported and that is operable using the armature;
   a valve-closing member that is actuatable by the valve needle and that cooperates with the valve-seat face to form a sealing seat;
   a stop element that is mounted fixedly on the valve needle and that interacts with at least one outlet opening of at least one through-flow channel such that throttling takes place with respect to the least one through-flow channel when the armature is located with its end face at the stop element; and
   a further stop element, which has a further stop face, that is fixed with respect to the valve needle, wherein an internal-pole stop face is formed on an internal pole, wherein the internal-pole stop face of the internal pole and the further stop face of the further stop element face a further end face of the armature that faces away from the end face of the armature;
   wherein a stop face, which is of the stop element, faces the end face of the armature, and wherein the stop face includes a tapered section which tapers away from a longitudinal axis of the valve needle, so that a space between the armature and the stop element forms a wedge shape that increases outwardly, wherein the space between the armature and the stop element that forms the wedge-shape aids hydraulic movement of the armature to the stop element during operation, and wherein the stop element also has an outer side that faces away from the end face of the armature and is tapered at least in another section to form a tapered area on the outer side,
   wherein the stop element, which has the outer side that faces away from the end face of the armature, includes the tapered area in which a plurality of slots or bores are disposed,
   wherein the plurality of slots or bores is greater in number than the plurality of through-flow channels or the plurality of outlet openings,
   wherein the tapered section is covered by at least a portion of each of the through-flow channels, and
   wherein the plurality of slots or bores are bores formed on the stop element, and which are arranged to permit a restricted flow with respect to the at least one through-flow channel when the armature is located with the end face of the armature at the stop element.

2. The valve of claim 1, wherein each of at least one of a plurality of through-flow channels is formed with an at least approximately round shaped through-flow cross-section.

3. The valve of claim 1, wherein each of the at least one outlet openings is formed at least approximately as a round shaped outlet opening.

4. The valve of claim 1, wherein the plurality of through-flow channels, and the plurality of outlet openings are uniformly distributed circumferentially about the longitudinal axis of the valve needle on the end face of the armature.

5. The valve of claim 1, wherein the plurality of through-flow channels, and the plurality of outlet openings are disposed with a same radial distance to the longitudinal axis of the valve needle on the end face of the armature.

6. The valve of claim 1, wherein the armature is surrounded by a liquid fluid.

7. The valve of claim 1, wherein the slots formed on the stop element are arranged to permit a restricted flow with respect to the at least one through-flow channel when the armature is located with the end face of the armature at the stop element.

8. The valve of claim 7, wherein the slots extend radially relative to the longitudinal axis of the valve needle.

9. The valve of claim 7, wherein the slots are uniformly distributed circumferentially on the stop element.

10. The valve of claim 1, wherein through-openings of the stop element are formed at least partially as bores.

11. The valve of claim 1, wherein through-openings are uniformly distributed circumferentially on the stop element.

12. The valve of claim 1, wherein the armature and the valve needle move further together in an opening direction until the armature strikes against the stop face of the stop element.

13. The valve of claim 1, wherein the valve is a fuel injection valve for an internal combustion engine.

\* \* \* \* \*